United States Patent
Lee et al.

(10) Patent No.: US 8,661,143 B2
(45) Date of Patent: Feb. 25, 2014

(54) RESERVING RESOURCES IN CENTRALIZED NETWORK BY SCANNING SUPERFRAMES EQUAL TO OR GREATER THAN MAXIMUM NUMBER OF SUPERFRAMES ALLOWED WITHOUT LISTENING TO BEACON PERIOD

(75) Inventors: Moon-Won Lee, Daejeon (KR);
Sung-Jin You, Daejeon (KR);
Gwangzeen Ko, Seoul (KR);
Myung-Sun Song, Daejeon (KR);
Chang-Joo Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 51 days.

(21) Appl. No.: 13/145,078

(22) PCT Filed: Jan. 15, 2010

(86) PCT No.: PCT/KR2010/000245
§ 371 (c)(1),
(2), (4) Date: Jul. 18, 2011

(87) PCT Pub. No.: WO2010/082773
PCT Pub. Date: Jul. 22, 2010

(65) Prior Publication Data
US 2011/0289175 A1    Nov. 24, 2011

(30) Foreign Application Priority Data
Jan. 16, 2009  (KR) .................... 10-2009-0003742

(51) Int. Cl.
*G06F 15/16* (2006.01)
*G06F 15/173* (2006.01)

(52) U.S. Cl.
USPC ............................ 709/228; 709/225

(58) Field of Classification Search
USPC ..................... 709/208–211, 225
See application file for complete search history.

(56) References Cited

U.S. PATENT DOCUMENTS

| | | | | |
|---|---|---|---|---|
| 5,305,469 A | * | 4/1994 | Camiade et al. | 455/78 |
| 5,430,775 A | * | 7/1995 | Fulghum et al. | 375/134 |
| 5,835,714 A | * | 11/1998 | Herzl et al. | 709/208 |
| 6,999,441 B2 | * | 2/2006 | Flammer et al. | 370/337 |
| 7,411,933 B2 | * | 8/2008 | Sugaya | 370/337 |
| 2004/0253948 A1 | * | 12/2004 | Laberteaux | 455/422.1 |
| 2005/0204044 A1 | | 9/2005 | Araki | |
| 2008/0229207 A1 | * | 9/2008 | Kataoka | 715/730 |
| 2009/0168713 A1 | * | 7/2009 | Shao et al. | 370/329 |
| 2010/0002676 A1 | * | 1/2010 | Doi et al. | 370/345 |
| 2011/0064117 A1 | * | 3/2011 | Subramanian et al. | 375/135 |
| 2011/0261793 A1 | * | 10/2011 | Cavalcanti et al. | 370/336 |
| 2011/0289175 A1 | * | 11/2011 | Lee et al. | 709/208 |

FOREIGN PATENT DOCUMENTS

| KR | 1020040051281 | 6/2004 |
|---|---|---|
| KR | 1020050037933 | 4/2005 |

OTHER PUBLICATIONS

International Search Report and Written Opinion for Application No. PCT/KR2010/000245, dated Augsut 31, 2010.

* cited by examiner

*Primary Examiner* — Lance L Barry
(74) *Attorney, Agent, or Firm* — Nelson Mullins Riley & Scarborough LLP

(57) ABSTRACT

A resource reservation method between a master device and a slave device or between slave devices in a centralized network. In resource reservation between slave devices, optimal resources may be allocated by performing link measurement between the slave devices before allocating the resources.

8 Claims, 4 Drawing Sheets

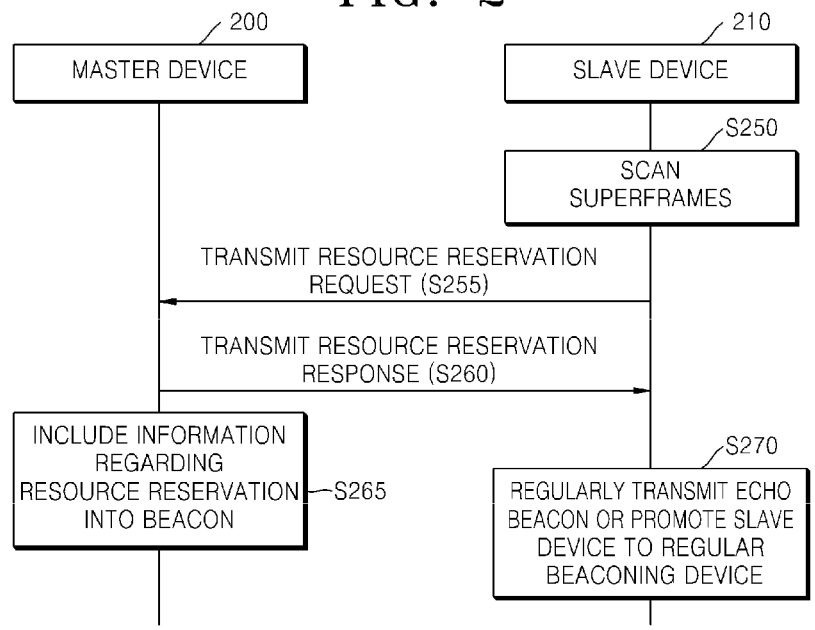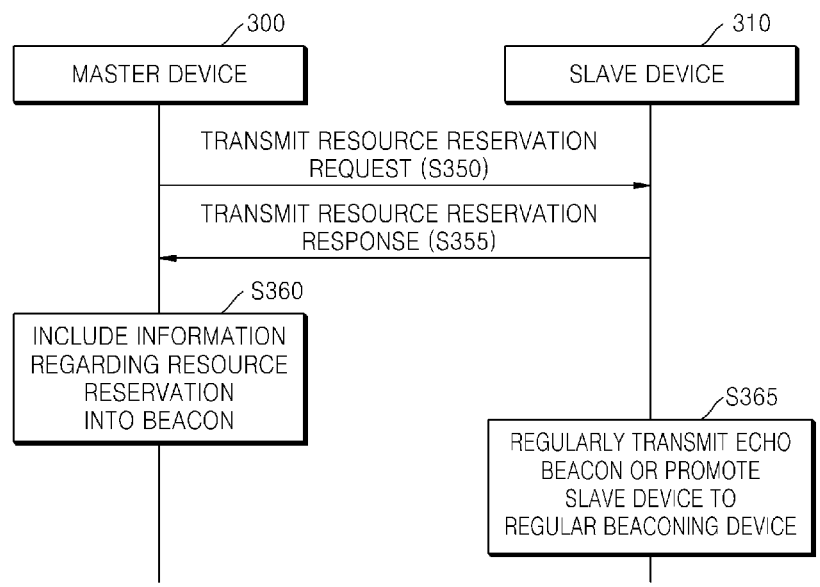

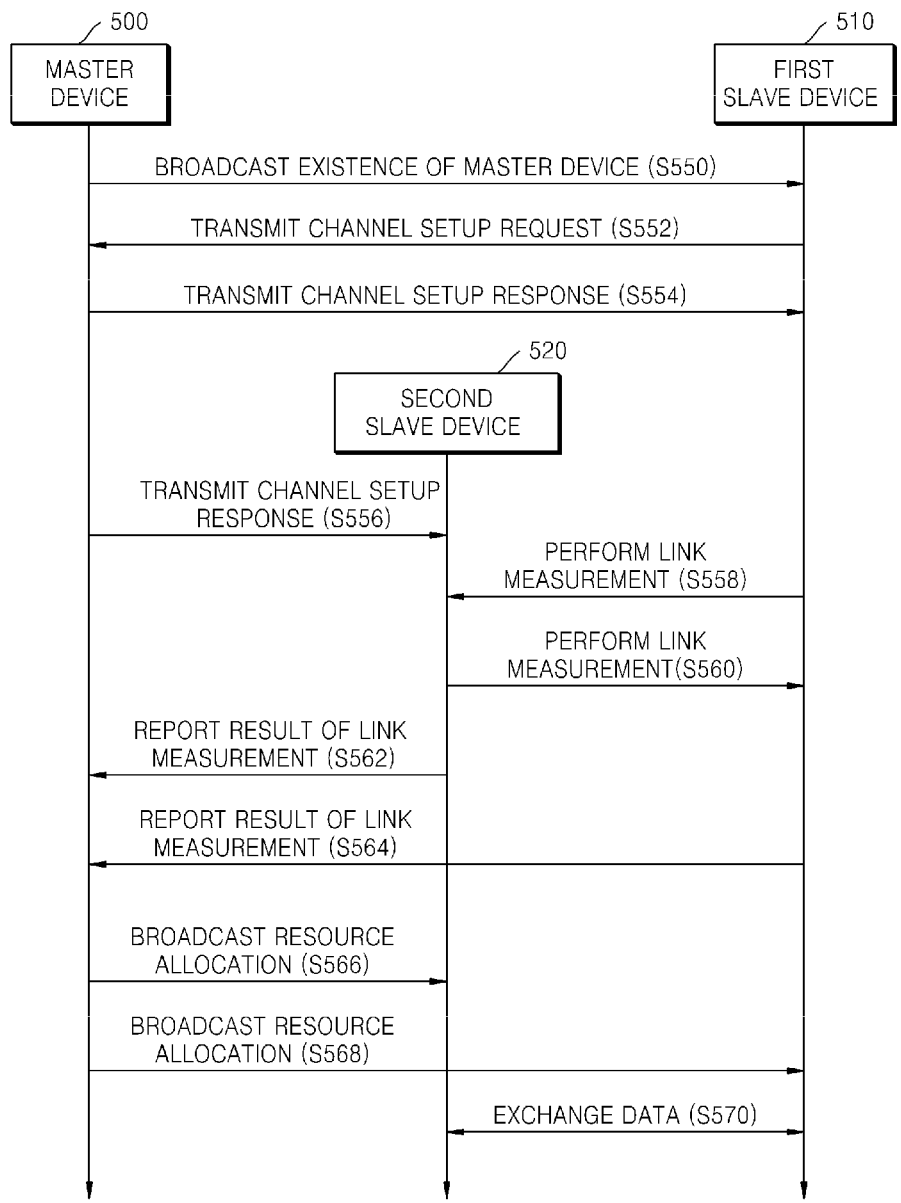

RESERVING RESOURCES IN CENTRALIZED
NETWORK BY SCANNING SUPERFRAMES
EQUAL TO OR GREATER THAN MAXIMUM
NUMBER OF SUPERFRAMES ALLOWED
WITHOUT LISTENING TO BEACON PERIOD

RELATED APPLICATIONS

This application is a 35 U.S.C. §371 national stage filing of PCT Application No. PCT/KR2010/000245 filed on Jan. 15, 2010, which claims priority to, and the benefit of, Korean Patent Application No. 10-2009-0003742 filed Jan. 16, 2009. The contents of the aforementioned applications are hereby incorporated by reference.

TECHNICAL FIELD

The present invention relates to a resource reservation method for efficiently using resources in a centralized network, and more particularly, to a resource reservation method between a master device and a slave device or between slave devices in a centralized network.

BACKGROUND ART

A master device for efficiently controlling the whole network at the center of the network, e.g., a base station or an access point (AP) exists in a conventional centralized network.

If a centralized control device such as a master device allocates resources such as time slots or frequency slots to a slave device that attempts to initially access a network, by checking situations of other slave devices in the network, the state of a communication link between slave devices may not be accurately checked and thus resources may not be efficiently allocated.

For example, in order to set a communication channel between first and second slave devices, the first slave device requests a master device for a communication channel between the first and second slave devices via a communication channel with the master device, and the master device allocates communication resources to the second slave device via a communication channel with the second slave device. In this case, the master device may not accurately check the state of a communication link between the first and second slave devices and thus may not efficiently allocate resources.

DISCLOSURE OF THE INVENTION

Technical Problem

The present invention provides an efficient resource reservation method between a master device and a slave device in a centralized network.

The present invention also provides an efficient resource reservation method between slave devices by performing link measurement in a centralized network.

Technical Solution

According to an aspect of the present invention, there is provided a resource reservation method of a master device in a centralized network including the master device and a slave device when the master device is a reservation target and the slave device is a reservation owner, the method including receiving a resource reservation request from the slave device; transmitting a resource reservation response to the slave device; and including information regarding resource reservation into a beacon.

According to another aspect of the present invention, there is provided a resource reservation method of a slave device in a centralized network including a master device and the slave device when the master device is a reservation target and the slave device is a reservation owner, the method including scanning resources; transmitting a resource reservation request to the master device; and receiving a resource reservation response from the master device.

According to another aspect of the present invention, there is provided a resource reservation method of a master device in a centralized network including the master device and a slave device when the master device is a reservation owner and the slave device is a reservation target, the method including transmitting a resource reservation request to the slave device; receiving a resource reservation response from the slave device; and including information regarding resource reservation into a beacon.

According to another aspect of the present invention, there is provided a resource reservation method of a slave device in a centralized network including a master device and the slave device when the master device is a reservation owner and the slave device is a reservation target, the method including receiving a resource reservation request from the master device; and transmitting a resource reservation response to the master device.

According to another aspect of the present invention, there is provided a resource reservation method of a master device for resource reservation between first and second slave devices in a centralized network including the master device and the first and second slave devices when the first slave device is a reservation owner and the second slave device is a reservation target, the method including receiving a slot request from the first slave device; allocating a slot to the first slave device; and informing the network about reservation negotiation between the first and second slave devices.

According to another aspect of the present invention, there is provided a resource reservation method of a first slave device in a centralized network including a master device, the first slave device, and a second slave device when the first slave device that is a reservation owner and the second slave device is a reservation target, the method including performing link measurement between the first and second slave devices; transmitting a resource reservation request to the second slave device; receiving a resource reservation response from the second slave device; and listening to resource reservation by the master device.

According to another aspect of the present invention, there is provided a resource reservation method of a second slave device in a centralized network including a master device, a first slave device, and the second slave device when the first slave device is a reservation owner and the second slave device is a reservation target, the method including receiving from the first slave device an examination command frame for link measurement; transmitting to the first slave device an examination command frame including information elements (IEs) to report the link measurement; receiving a resource reservation request from the first slave device; transmitting a resource reservation response to the first slave device; and listening to resource reservation by the master device.

Advantageous Effects

According to the present invention, resource reservation between a master device and a slave device may be efficiently performed. In particular, optimal resources may be allocated to a slave device by measuring links between slave devices.

BRIEF DESCRIPTION OF THE DRAWINGS

FIGS. 2 and 3 are diagrams for describing a resource reservation method between a master device and a slave device in a centralized network, according to an embodiment of the present invention;

FIG. 5 is a diagram for describing a resource reservation method between slave devices in a centralized network, according to another embodiment of the present invention.

BEST MODE FOR CARRYING OUT THE INVENTION

Figure 1:
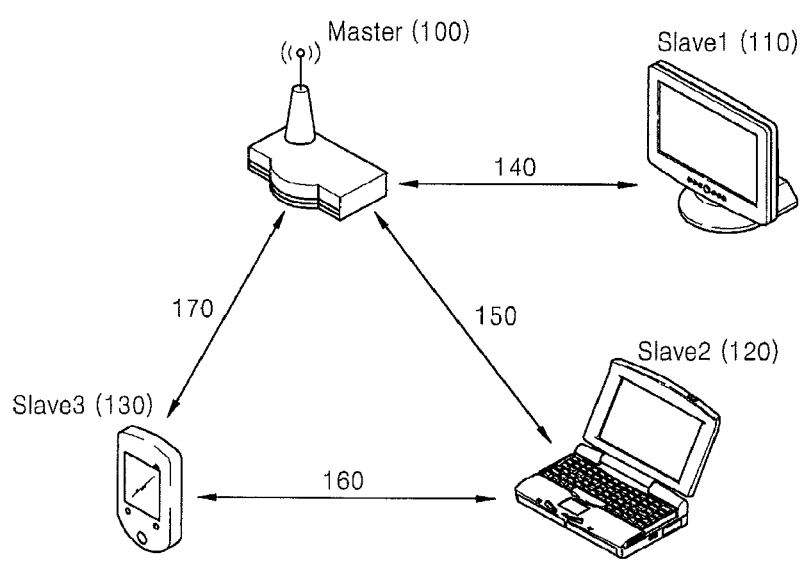
FIG. 1 is a schematic diagram showing a centralized network according to an embodiment of the present invention.

According to an aspect of the present invention, there is provided a resource reservation method of a master device in a centralized network including the master device and a slave device when the master device is a reservation target and the slave device is a reservation owner, the method including receiving a resource reservation request from the slave device; transmitting a resource reservation response to the slave device; and including information regarding resource reservation into a beacon.

According to another aspect of the present invention, there is provided a resource reservation method of a slave device in a centralized network including a master device and the slave device when the master device is a reservation target and the slave device is a reservation owner, the method including scanning resources; transmitting a resource reservation request to the master device; and receiving a resource reservation response from the master device.

According to another aspect of the present invention, there is provided a resource reservation method of a master device in a centralized network including the master device and a slave device when the master device is a reservation owner and the slave device is a reservation target, the method including transmitting a resource reservation request to the slave device; receiving a resource reservation response from the slave device; and including information regarding resource reservation into a beacon.

According to another aspect of the present invention, there is provided a resource reservation method of a slave device in a centralized network including a master device and the slave device when the master device is a reservation owner and the slave device is a reservation target, the method including receiving a resource reservation request from the master device; and transmitting a resource reservation response to the master device.

According to another aspect of the present invention, there is provided a resource reservation method of a master device for resource reservation between first and second slave devices in a centralized network including the master device and the first and second slave devices when the first slave device is a reservation owner and the second slave device is a reservation target, the method including receiving a slot request from the first slave device; allocating a slot to the first slave device; and informing the network about reservation negotiation between the first and second slave devices.

According to another aspect of the present invention, there is provided a resource reservation method of a first slave device in a centralized network including a master device, the first slave device, and a second slave device when the first slave device that is a reservation owner and the second slave device is a reservation target, the method including performing link measurement between the first and second slave devices; transmitting a resource reservation request to the second slave device; receiving a resource reservation response from the second slave device; and listening to resource reservation by the master device.

According to another aspect of the present invention, there is provided a resource reservation method of a second slave device in a centralized network including a master device, a first slave device, and the second slave device when the first slave device is a reservation owner and the second slave device is a reservation target, the method including receiving from the first slave device an examination command frame for link measurement; transmitting to the first slave device an examination command frame including information elements (IEs) to report the link measurement; receiving a resource reservation request from the first slave device; transmitting a resource reservation response to the first slave device; and listening to resource reservation by the master device.

MODE FOR INVENTION

Hereinafter, the present invention will be described in detail by explaining embodiments of the invention with reference to the attached drawings.

FIG. 1 is a schematic diagram showing a centralized network according to an embodiment of the present invention.

Referring to FIG. 1, the centralized network includes a master device 100 and a plurality of slave devices 110, 120, and 130. The master device 100 refers to a centralized control device for efficiently controlling a whole network having a centralized control scheme at the center of the network, e.g., a base station or an access point (AP). Communication resources may be, for example, time slots in a time division multiple access (TDMA) system, or sub-channels, i.e., bundles of subcarriers, in an orthogonal frequency division multiple access (OFDMA) system.

In order to set up communication channels between the master device 100 and the slave devices 110, 120, and 130 or between the slave devices 110, 120, and 130, resource reservation is performed. A device that requests for resource reservation is referred to as a reservation owner, and a device that is a target of resource reservation is referred to as a reservation target. Here, reservation refers to reservation of one or more medium access slots (MASs) having priorities to access a medium within a superframe, and a superframe refers to a periodic time interval for controlling frame transmission between devices.

FIG. 2 is a diagram for describing a resource reservation method between a master device 200 and a slave device 210 in a centralized network when the master device 200 is a reservation target and the slave device 210 is a reservation owner, according to an embodiment of the present invention.

Referring to FIG. 2, the slave device 210 that is a nonbeaconing device scans whether requested resources are reserved by other devices (not shown) (operation S250). For example, in order to check whether MASs, i.e., an example of resources, are not reserved by the other devices, the slave device 210 scans at least mMaxLostBeacons+1 superframes before transmitting channel reservation protocol (CRP) reservation request command frames (operation S250). Here, mMaxLostBeacons refers to a maximum value of the number of superframes allowed even when devices in a network do not listen to a beacon period.

The slave device 210 transmits a resource reservation request to the master device 200 (operation S255). Before resources are allocated, the slave device 210 may transmit the resource reservation request via an additional slot allocated for master-slave signal exchange. For example, the slave device 210 transmits a CRP reservation request command frame within a reservation-based signalling window (RSW) slot to the master device 200 (operation S255). Here, an RSW refers to a time window used to exchange control or management information in a reservation-based method, and a CRP refers to a protocol for supporting negotiation and management of channel time reservation.

For reservation negotiation, the master device 200 that receives the resource reservation request transmits a resource reservation response to the slave device 210 (operation S260). For example, if the master device 200 receives the CRP reservation request command frame as the resource reservation request, for reservation negotiation, the master device 200 transmits a CRP reservation response command frame in an RSW slot or transmits a CRP information element (IE) by including the CRP IE into a beacon of a next superframe. The master device 200 completes the reservation negotiation by including an appropriate CRP IE (i.e., information regarding the reservation negotiation) into a subsequent beacon (operation S265).

If resource reservation between the master device 200 and the slave device 210 is succeeded, in order to inform about the reservation, the slave device 210 regularly transmits an echo beacon or promotes itself to a regular beaconing device (operation S270).

If the slave device 210 starts the beaconing promotion process, the slave device 210 transmits a beaconing promotion request command frame to the master device 200. After the beaconing promotion request command frame is received, the master device 200 includes a beaconing promotion indication IE and an address of the slave device 210 promoted to a regular beaconing device into a beacon and transmits the beacon. Alternatively, the beaconing promotion process may be started if the master device 200 transmits the beaconing promotion indication IE and the address of the slave device 200 promoted to a regular beaconing device. The slave device 210 that receives the beaconing promotion indication IE from the master device 200 joins a beacon period.

FIG. 3 is a diagram for describing a resource reservation method between a master device 300 and a slave device 310 in a centralized network when the master device 300 is a reservation owner and the slave device 310 is a reservation target, according to an embodiment of the present invention.

Referring to FIG. 3, the master device 300 requests for reservation of resources such as channels by transmitting a resource reservation request to the slave device 310 (operation S350). For example, the master device 300 requests for reservation of channels by including a CRP IE into a beacon or a CRP reservation request command frame into an RSW slot.

If the resource reservation request is received from the master device 300, for reservation negotiation, the slave device 310 transmits a resource reservation response to the master device 300 (operation S355). For example, if the slave device 310 receives the CRP IE in the beacon from the master device 300, the slave device 310 transmits a reservation response command frame in an RSW slot. If the slave device 310 receives the CRP reservation request command frame in the RSW slot, the slave device 310 transmits a CRP reservation response command frame in the same or different RSW slot. Then, the master device 300 completes the reservation negotiation by including an appropriate CRP IE regarding the reservation negotiation into the beacon (operation S360).

If resource reservation between the master device 300 and the slave device 310 is succeeded, in order to inform about the reservation, the slave device 310 regularly transmits an echo beacon, or promotes itself to a regular beaconing device. The beaconing promotion process is described above in relation to FIG. 2, and thus a detailed description thereof is not provided here.

Figure 4:
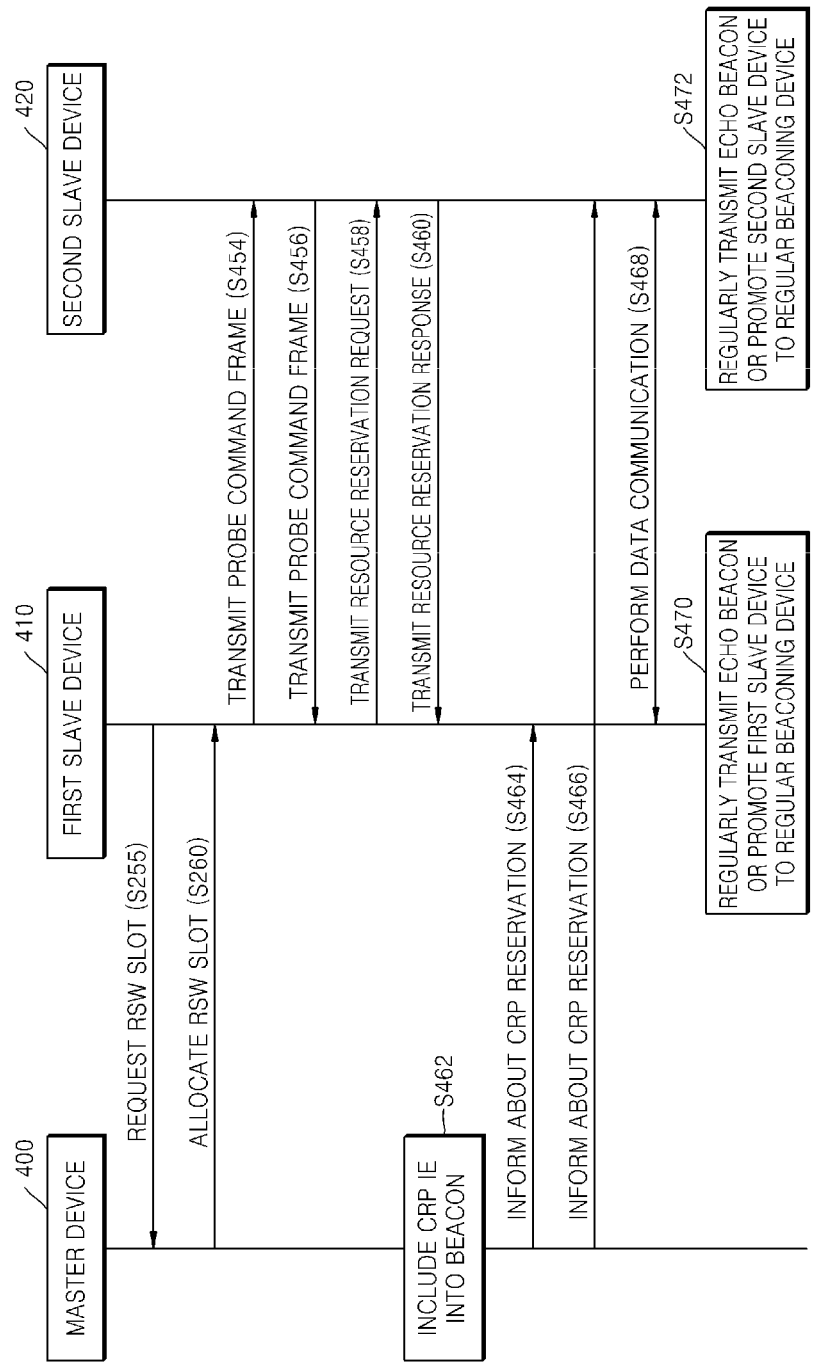
FIG. 4 is a diagram for describing a resource reservation method between slave devices in a centralized network, according to an embodiment of the present invention.

FIG. 4 is a diagram for describing a resource reservation method between first and second slave devices 410 and 420 in a centralized network, according to an embodiment of the present invention. In FIG. 4, the first slave device 410 is a reservation owner and the second slave device 420 is a reservation target.

Referring to FIG. 4, before the master device 400 allocates resources, the first slave device 410 requests for an additional slot to exchange control information. For example, the first slave device 410 transmits a RSW slot request in a contention signalling window (CSW) to exchange the control information (operation S255). Here, a CSW refers to a time window for exchange control or management information in a slotted Aloha-based method. The RSW slot request refers to a request for a channel reservation access (CRA) reservation target (i.e., another slave device).

The master device 400 allocates slots to the first slave device 410 such that the first slave device 410 may perform link measurement with the second slave device 420 (operation S260). For example, if the first slave device 410 transmits the RSW slot request, the master device 400 allocates RSW slots (operation S260). If the slots are allocated for the link measurement, the first slave device 410 transmits a probe command frame not including IEs to the second slave device 420 to request for the link measurement (operation S454). After the link measurement is performed, the second slave device 420 reports a result of the link measurement (operation S456). For example, in order to report the result of the link measurement, the second slave device 420 transmits a probe command frame including link feedback IEs or link quality estimation IEs (operation S456).

If the link measurement is performed, the first slave device 410 transmits a resource reservation request to the second slave device 420 (operation S458). Here, a CRP reservation request command frame may be transmitted as the resource reservation request. The second slave device 420 transmits a resource reservation response (operation S460). For example, a CRP reservation response frame may be transmitted as the resource reservation response. If resource reservation is succeeded, the master device 400 includes IEs (e.g., CRP IEs) regarding the first and second slave devices 410 and 420 into a beacon (operation S462), and informs the network about the resource reservation (e.g., CRP reservation) between the first and second slave devices 410 and 420 (operation S464 and S466).

After the resource reservation (e.g., CRP reservation) is informed by the master device 400, the first and second slave devices 410 and 420 perform data communication (operation S468). If reservation negotiation between the first and second slave devices 410 and 420 is failed or is not informed by the master device 400, the first and second slave devices 410 and 420 may re-start negotiation after a predetermined period of time, e.g., after mCRPslaveRetry superframes.

If resource reservation between the first and second slave devices 410 and 420 is succeeded, to inform about the resource reservation, the first and second slave devices 410 and 420 regularly transmit echo beacons or promote themselves to regular beaconing devices (operations S470 and S472).

If the first or second slave device 410 or 420 starts the beaconing promotion process, the first or second slave device 410 or 420 transmits a beaconing promotion request command frame to the master device 400. After the beaconing promotion request command frame is received, the master device 400 includes a beaconing promotion indication IE and an address of the first or second slave device 410 or 420 promoted to a regular beaconing device into a beacon and transmits the beacon. Alternatively, the beaconing promotion process may be started if the master device 400 transmits the beaconing promotion indication IE and an address of the first or second slave device 410 or 420 promoted to a regular beaconing device. The first or second slave device 410 or 420 that receives the beaconing promotion indication IE from the master device 400 joins a beacon period.

FIG. 5 is a diagram for describing a resource reservation method between first and second slave devices 510 and 520 in a centralized network, according to another embodiment of the present invention.

Referring to FIG. 5, the master device 500 periodically transmits in the network a message for informing about its existence (operation S550). The first slave device 510 that receives the message transmits to the master device 500 a channel setup request for requesting to set a communication channel with the second slave device 520 (operation S552).

The master device 500 that receives the channel setup request allocates certain portions of allowable resources to the first and second slave devices 510 and 520 or refuses resource allocation (operations S554 and S556). If the resources are allocated, the first and second slave devices 510 and 520 perform link measurement by exchanging channel environments regarding a communication link therebetween (operations S558 and S560). The first and second slave devices 510 and 520 report a result of the link measurement to the master device 500 (operations S562 and S564), and the master device 500 calculates an appropriate amount of resources by checking the quality of the communication link between the first and second slave devices 510 and 520 and informs the first and second slave devices 510 and 520 about resource allocation (operations S566 and S568). The first and second slave devices 510 and 520 exchange data via the communication link therebetween by using the allocated amount of resources (operation S570).

The above-described resource reservation scheme between slave devices is a multi-staged negotiation scheme. A multi-staged negotiation scheme refers to a process including a channel measurement process between slave devices. Also, channel measurement between devices may be periodically performed and a master device may have information regarding the channel measurement. In this case, if a newly accessed device has a pervious measurement history, the channel measurement process may be omitted to proceed to a next process, and thus an initial access time may be reduced. Furthermore, according to the present invention, measurement of an environment of a communication channel between slave devices may be performed in advance to an initial accessing process and a periodic/nonperiodic channel information updating process.

The present invention can also be implemented as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, etc. The computer-readable recording medium can also be distributed over network-coupled computer systems so that the computer-readable code is stored and executed in a distributed fashion.

While the present invention has been particularly shown and described with reference to exemplary embodiments thereof, it will be understood by one of ordinary skill in the art that various changes in form and details may be made therein without departing from the spirit and scope of the invention as defined by the following claims. The exemplary embodiments should be considered in a descriptive sense only and not for purposes of limitation. Therefore, the scope of the invention is defined not by the detailed description of the invention but by the following claims, and all differences within the scope will be construed as being included in the present invention.

The invention claimed is:

1. A resource reservation method of a master device in a centralized network including the master device and a slave device when the master device is a reservation target and the slave device is a reservation owner, the method comprising:

receiving a resource reservation request from the slave device which scans superframes to check whether resources are not reserved by the other devices by scanning superframes equal to or greater than a maximum value of a number of superframes allowed even without listening to a beacon period;

transmitting a resource reservation response to the slave device; and including information regarding the resource reservation into a beacon.

2. The method of claim 1, wherein the receiving of the resource reservation request comprises receiving a channel reservation protocol (CRP) reservation request command frame in a reservation-based signalling window (RSW) slot from the slave device.

3. The method of claim 1, wherein the transmitting of the resource reservation response comprises transmitting a CRP reservation response command frame in an RSW slot, or transmitting a CRP information element (IE) by including the CRP IE into a beacon of a next superframe.

4. The method of claim 1, wherein the including of the information regarding resource reservation comprises including a CRP IE regarding resource reservation into the beacon.

5. A resource reservation method of a slave device in a centralized network including a master device and the slave device when the master device is a reservation target and the slave device is a reservation owner, the method comprising:

scanning superframes to check whether resources are not reserved by the other devices, wherein the scanning superframes comprises scanning superframes equal to or greater than a maximum value of a number of superframes allowed even without listening to a beacon period;

transmitting a resource reservation request to the master device; and receiving a resource reservation response from the master device.

6. The method of claim 5, wherein the transmitting of the resource reservation request comprises transmitting a channel reservation protocol (CRP) reservation request command frame in a reservation-based signalling window (RSW) slot.

7. The method of claim 5, wherein the receiving of the resource reservation response comprises receiving a CRP reservation response command frame in an RSW slot, or receiving a next superframe in which a CRP information element (IE) is included in a beacon.

8. The method of claim 5, further comprising regularly transmitting an echo beacon or promoting the slave device to a regular beaconing device after resource reservation is completed.

\* \* \* \* \*